Feb. 19, 1963 R. MONAGHAN 3,078,370
METHOD FOR GAMMA RAY SPECTRAL ANALYSIS
Filed Jan. 2, 1958 2 Sheets-Sheet 1

INVENTOR.
RALPH MONAGHAN
BY
AGENT

United States Patent Office 3,078,370
Patented Feb. 19, 1963

3,078,370
METHOD FOR GAMMA RAY SPECTRAL ANALYSIS
Ralph Monaghan, Tulsa, Okla., assignor to Well Surveys, Incorporated, a corporation of Delaware
Filed Jan. 2, 1958, Ser. No. 706,768
3 Claims. (Cl. 250—83.3)

This invention relates to radioactivity well logging and is particularly directed to novel methods and apparatus for gamma ray logging.

In the past, there have been two types of gamma ray logs which have generally been made. One of these is called "natural gamma ray" logging and is based on the fact that there are certain radioactive substances which are contained to a greater or lesser extent in substantially all rocks. The most important of these substances are potassium, radium, thorium and their decay products. These substances each emit gamma rays of various energies and, by traversing a borehole with a gamma ray detector, it is possible to detect these gamma rays. As is well known, a record or "log" may be made showing the number of gamma rays detected as a function of the depth of the detector in the borehole, and such logs have been found to provide extremely important lithologic information concerning the formations surrounding the borehole.

The other type of gamma ray log which has achieved general recognition is called the "density log." To obtain this type of log, a source of gamma rays is passed through the borehole together with a gamma ray detector which is spaced a predetermined distance from the source and is shielded to prevent gamma rays from passing directly from the source to the detector without penetrating the formations surrounding the borehole. The gamma rays emitted by the source irradiate the formations and become scattered to the extent that some of the gamma rays return to the borehole and are observed by the detector. It has been found that the number of gamma rays returned to the borehole is inversely related to the density of the formations. Accordingly, by recording the detector output, a log may be made showing the densities of the various formations penetrated by the borehole. Since density is generally related to porosity, it is obvious that such a log is very valuable in exploration for oil, gas, water and the like.

Each of these logs is an important aid to geophysical prospecting and each provides information which the other log does not. However, a gamma ray detector in a density logging instrument will detect natural gamma rays in addition to those which have been emitted by the source and scattered by the formations. Consequently, it is necessary to make both types of gamma ray log so that the effect of the natural gamma rays can be taken into account in interpreting the density log. Unfortunately, it has not been possible heretofore to make both logs simultaneously with a single detector since the detector could not determine the origin of incident gamma rays. Thus, it was necessary to employ an instrument which included two separate detectors. This requires instruments which are very long and, hence, are cumbersome to handle and are more likely to get stuck in the well. In addition, the greater length causes poorer contact with the wall of the well in portions of the well where the wall is not absolutely smooth.

Furthermore, in density logging, a large portion of the gamme rays emitted by the source travel through the fluids within the well and reach the detector without penetrating the formations. Consequently, the diameter of the well, the presence and density of fluids in the well, the position of the instrument with respect to the wall of the well and similar parameters have a considerable influence on the gamma rays.

These effects of the well and its contents are referred to collectively as "borehole effect" and, with prior art apparatus, the borehole effect was considered detrimental. To reduce the borehole effect, it has been suggested to provide a resilient skid or similar means to urge the instrument against the wall of the well and to locate the source and detector eccentrically in the instrument and immediately adjacent that portion of the instrument which is in contact with the wall of the well. Moreover, shielding material is provided which substantially fills the instrument and which is formed with recesses adjacent the portion of the instrument nearest the formations to house the detector and source. The skid facilitates gamma rays from the source irradiating the formations and returning to the detector from the formations whereas the shielding reduces the number of gamma rays passing directly from the source into the well fluid and from the well fluid to the detector. This generally makes it possible to detect enough of the gamm rays which have penetrated the formations to obtain a readable density log.

On the other hand, radioactivity well logging instruments must be of very small diameter, conventionally 3⅝ inches, in order to pass through the well. Therefore, the amount of shielding which can be provided is extremely limited, and a large number of gamma rays will still be able to penetrate the shielding and pass into the well fluids. Since the well fluids are considerably less dense than the rock formations, the gamma rays can travel through the well fluids with very little scattering and will arrive in the vicinity of the detector with a wide range of energies, whereas the "formation" gamma rays must undergo very considerable scattering and, therefore, will arrive in the vicinity of the detector with only moderate or low energies. Those "borehole" gamma rays which arrive in the vicinity of the detector with relatively low energies will be stopped by the shielding. However, the "formation" gamma rays enter the unshielded portion of the instrument and, consequently, can reach the detector. On the other hand, many of the "borehole" gamma rays will have sufficient energy to pass through the shielding to the detector. These "borehole" gamma rays will lose some energy in passing through the shielding but will still actuate the detector and, at higher energies, the number of borehole gamma rays will greatly exceed the number of gamma rays from the formations.

In addition, as the well is drilled, special drilling mud is pumped into the borehole. Some of this mud will become caked on the walls of the borehole. The more porous the formation, the more such caking will occur. When this happens, there will be some "formation" gamma rays which will have insufficient energy to penetrate the mud cake.

These disadvantages of prior art gamma ray logging are overcome with the present invention and novel methods and apparatus for gamma ray logging are provided which permit simultaneous density and natural gamma ray logging with a single detector. Thus, a gamma ray logging instrument is provided which is approximately one-third shorter than the prior art instruments and which is, consequently, lighter, easier to handle and has less chance of becoming stuck in the well.

The advantages of the present invention are preferably attained by providing a gamma ray logging instrument which is similar to the density logging instruments of the prior art in that it has a gamma ray source, a gamma ray detector, a skid urging the instrument against a wall of the well and gamma ray sh'elding substantially filling the instrument and formed with recesses adjacent the portion of the instrument nearest the formations to house the source and detector. However, in some instances, the skid may be omitted. The apparatus of the present invention differs from that of the prior art in that the gamma ray detector must be of the type which emits electrical pulses that are systematically related to the energy of the incident gamma rays and a plurality of electronic pulse height analyzer circuits are connected to receive signals from the detector and to separate them into appropriate channels of several separate signal channels, each of which corresponds to a different band in the energy spectrum of the gamma rays.

It has been found that while potassium, radium, thorium and their decay products each emit gamma rays of various energies, these substances each emit some characteristic gamma rays with energies in excess of 1 mev. whereas most of the gamma rays emitted by conventional density logging instrument sources reach the detector with energies appreciably less than 1 mev. Thus, it is possible to distinguish between those pulses from the detector which correspond to gamma rays from the instrument source and those which correspond to natural gamma rays. Thus, with a single detector, density and natural gamma ray logs can be made simultaneously.

In addition to permitting simultaneous density and natural gamma ray logging, the present invention provides additional valuable information. Since the gamma rays lose energy during the scattering, it will be apparent that the energy with which the gamma rays reach the detector will be dependent upon the amount of scattering which they have undergone as well as upon their initial energy. Moreover, as indicated above, those gamma rays which are emitted from the instrument source and travel through the well fluids without penetrating the formations undergo little scattering and many will arrive at the detector with sufficient energy to penetrate the shielding. Thus, it has been found that at relatively high energies, of the order of several hundred kev., the number of borehole gamma rays is related to the diameter of the borehole. Furthermore, the number of formation gamma rays having energies in this range is quite small. Consequently, by recording that portion of the detector output corresponding to gamma rays having energies in this range, a caliper log of the borehole may be made.

In addition, as indicated previously, drilling mud has a tendency to cake on the walls of the well adjacent porous formations and will act as a shield to prevent very low energy formation gamma rays from reaching the detector. However, the effectiveness of this "shield" will vary with the thickness of the mud cake. Thus, by recording that portion of the detector output corresponding to these low energy gamma rays, a log may be made of mud cake thickness and, hence, of the porosity of the formations.

Thus, the apparatus of the present invention not only makes it possible to run density and natural gamma ray logs simultaneously with a single detector but also provides information concerning the borehole and the surrounding formations which has not been available heretofore.

Accordingly, it is an object of the present invention to provide novel methods and apparatus for gamma ray logging.

Another object of the present invention is to provide novel methods and apparatus for performing density and natural gamma ray logging which is considerably shorter in length and is, therefore, lighter, easier to handle and has less chance of becoming stuck in a well.

A further object of the present invention is to provide novel methods and apparatus for making density and natural gamma ray logs with a single detector.

An additional object of the present invention is to provide novel methods and apparatus for making a spectral analysis of the energy of gamma rays incident on the detector.

A specific object of the present invention is to provide a novel means for radioactivity well logging comprising a gamma ray source, a gamma ray detector, electronic means for performing a spectral analysis of the energy spectrum of gamma rays reaching said detector, and means for independently recording the detector output corresponding to desired portions of said spectrum.

These and other objects and features of the present invention will be apparent from the following description thereof wherein reference is made to the figures of the accompanying drawing.

Figures 1, 2:
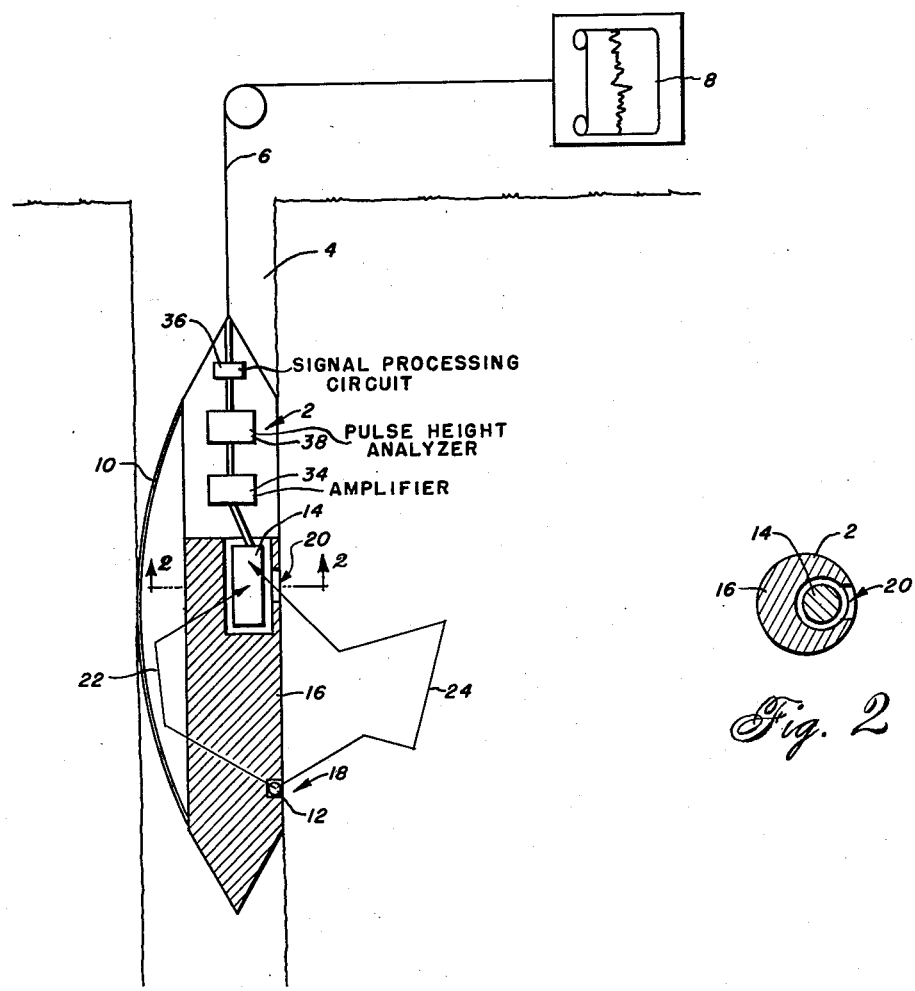
FIG. 1 is a sectional view of a typical well logging instrument embodying the invention.
FIG. 2 is a cross-sectional view of the device of FIG. 1, taken on the line 2—2 thereof.

In that form of the invention chosen for purposes of illustration in the drawing, FIG. 1 shows a typical subsurface well logging instrument 2 suspended in a well 4 by a cable 6. The cable 6 also serves to transmit signals from the instrument 2 to a recording device 8 at the surface of the earth. A skid 10 is secured to the instrument 2 adjacent the opposite ends thereof and tends to urge the instrument 2 against the wall of the well 4.

Within the instrument 2 are housed a source 12 of gamma radiation and a gamma ray detector 14 spaced a predetermined distance apart. The source 12 may be of any desired type. However, the detector 14 is preferably a proportional counter, scintillation counter or other similar device which will give an electrical output pulse that is systematically related to the energy of the incident gamma ray. A shield 16 of any suitable material, such as lead or other heavy metal, is provided which substantially fills the instrument 2 and which is formed with a pair of spaced recesses 18 and 20 adjacent that portion of the instrument which engages the wall of the well. The source 12 is mounted in recess 18 while the detector 14 is mounted in recess 20 so as to reduce the number of gamma rays being emitted into the well by source 12 and similarly to reduce the number of gamma rays passing from the well to the detector 14.

Obviously regardless of whether the gamma rays from source 12 pass through the shielding 16 and travel through the well 4, as indicated at 22, or are scattered about through the formations, as seen at 24, the gamma rays will arrive in the vicinity of detector 14 with a wide range of energies.

Figure 3:
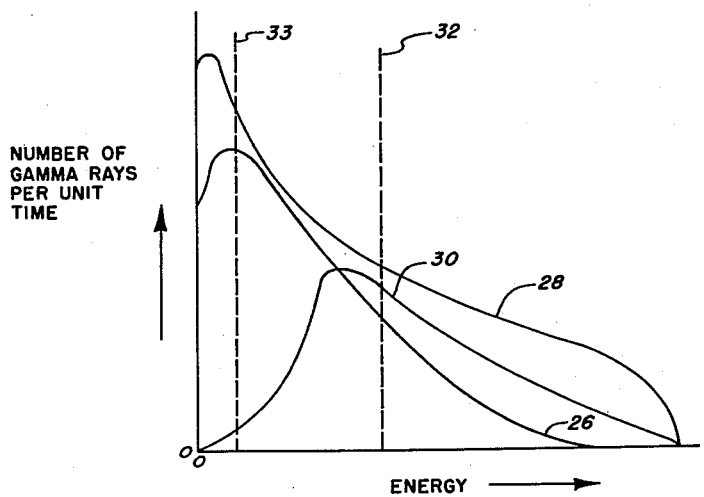
FIG. 3 is a graph showing the distribution of energy of gamma rays striking the detector of the device of FIG. 1.

However, those gamma rays which penetrate the formations will generally undergo many scatterings and, since gamma rays lose energy each time they are scattered, the vast majority of these gamma rays will arrive in the vicinity of the detector 14 with relatively low energies. The area below curve 26 in FIG. 3 illustrates the energy distribution on only those gamma rays which enter the formation.

On the other hand, those gamma rays which travel through the less dense well fluids will undergo fewer scatterings and, therefore, many of these gamma rays will arrive in the vicinity of the detector with relatively high energies, although the energies will range downward to include low energies where there has been multiple scattering in the borehole fluid. The area below curve 28 illustrates energy distribution of only the borehole gamma rays when no shielding was provided about the detector.

Since shielding is provided, as indicated at 16 in FIG. 1, most of the low energy gamma rays will be absorbed by the shielding and will be unable to reach the detector 14. At higher energies, however, the gamma rays will pass through the shield 16 relatively unaffected. Thus, the effect of the borehole gamma rays as "seen" by detector 14 when shield 16 is provided is illustrated by the area below curve 30 in FIG. 3. It will be apparent from this that the shield 16 is of little effect against high energy gamma rays. The position of the peak in curve 30 depends, of course, upon the thickness of the shield. However, since the shield thickness is limited in well logging instruments by the diameter of the detector 14, on the one hand, and the diameter of the instrument, on the other, the peak of curve 30 will generally be found at about 350 kev. if a cobalt 60 source is used. Above this peak, as seen in FIG. 3, the ratio of borehole gamma rays detected to formation gamma rays detected increases and any information carried by the formation gamma rays will, consequently, be increasingly obscured until at about 500 kev. the contribution of the formation gamma rays is negligible. Accordingly, it would be desirable to eliminate that portion of the detector output corresponding to the high energy gamma rays, for example, those portions of the areas below curves 26 and 30 which lie to the right of the vertical dotted line 32.

As stated above, detector 14 is preferably of the type which emits an electrical output pulse which is systematically related to the energy of the incident gamma ray. Conventionally, all of the pulses from detector 14 are passed through an amplifier 34 and signal processing circuits 36, as seen in FIG. 1, and then applied to the cable 6 for transmission to the recording device 8. The signal processing circuits 36 may include conventional circuits for shaping and coding the pulses and impressing them on the cable 6 in a suitable manner. However, by connecting a conventional discriminator or pulse height analyzer circuit 38 between amplifier 34 and processing circuits 36 and adjusting it to pass only pulses corresponding to gamma rays having energies of the order of 100 to 500 kev., the borehole effect may be drastically reduced. This would in effect, mean passing only those pulses which correspond to the areas under curves 26 and 30 which lie to the left of vertical dotted line 32, in FIG. 3 and to the right of dotted line 33. As indicated above, the number of "formation" gamma rays reaching detector 14 exceeds the number of "borehole" gamma rays in these areas. Consequently, a log is produced which is much more truly representative of the density characteristics of the formations surrounding the well and which may easily be interpreted even by relatively unskilled technicians.

Furthermore, if the side of the instrument is not actually in contact with the wall of the well but is separated from the wall, gamma rays can pass directly from the source 12 into the well fluids and from the well fluids to the detector 14. With prior art instruments, this causes a tremendous increase in the counting rate and thereby causes an error in the log, resulting in an erroneous density reading. However, since these gamma rays travel through the less dense well fluids and do not even have to penetrate the shielding 16, they will generally have quite high energies and will be excluded from the density log by the pulse height analyzers. Thus, with the present invention, it will be possible for some purposes to actually omit the skid 10. On the other hand, since gamma rays of very low energies have very low penetrating power, the additional well fluids, introduced between the instrument window and the wall of the well as a result of the separation, will act as a shield to prevent the low energy gamma rays from reaching the detector. This, also, will cause an error in the density reading. Thus, it will be seen that erroneous density readings may be caused by either gamma rays of very high energy, gamma rays of very low energy, or both. However, as described above, the pulses from detector 14 corresponding to the vast majority of these unwanted gamma rays will be cancelled by the pulse height analyzer circuit 38. Thus, errors due to separation of the instrument from the wall will be materially reduced.

While the elimination from the density log of the effect of unwanted gamma rays will greatly improve the density log, experimental evidence indicates that more comprehensive analysis of the gamma ray energy spectrum yields additional information concerning the formations surrounding the borehole. Thus, for example, using a cobalt 60 gamma ray source, it appears that analysis of gamma rays having energies less than about 100 kev. will provide lithologic information due to variations in the mass-absorption coefficients of the formations. At the same time, gamma rays having energies of the order of 100 to 150 kev. will yield information concerning the thickness of mud cake on the wall of the well. Gamma rays having energies generally within the range of 100 to 500 kev. have been found to provide the most reliable density logs, as described above. Furthermore, those gamma rays having energies above 500 kev. have been found to indicate variations in borehole diameter. Thus, the energy spectrum of the gamma rays may be divided into several different bands, each of which provides different information concerning characteristics of the formations or the borehole. It will be obvious that these values will be different if other sources, such as cesium or thorium, are used in the instrument.

As indicated previously, there are some naturally radioactive substances which are found in substantially all rock. The most important of these substances are potassium, radium and thorium which emit gamma rays having energies of 1.4 mev., 2.2 mev. and 2.6 mev., respectively. On the other hand, except for thorium, it is not practical to employ these substances as instrument sources. Instead, such substances as cesium 137 or cobalt 60 are generally used. These latter substances emit gamma rays having maximum energies of 661 kev. and 1.33 mev., respectively. Moreover, in order to reach the detector, gamma rays from the instrument source must undergo considerably more scattering than a considerable proportion of the natural gamma rays detected. Thus, by observing those gamma rays having energies above 1 mev., virtually all of the gamma rays emitted by the instrument source will be excluded and a log may be made of the natural gamma rays. As is well known in the art, such a log is extremely valuable in obtaining lithologic information. Moreover, these energies are characteristic of the related elements and, consequently, by measuring the number of gamma rays having these energies, it is possible to determine the quantities of these elements occurring in the formations and this information may be used, among other purposes, to determine the effect of these elements on the density log. In the event that thorium is employed as an instrument source, it will still be possible to obtain such a log. However, with such a source, lithologic information could best be obtained from those gamma rays having energies of the order of 2.4 mev. or greater.

Figure 4:
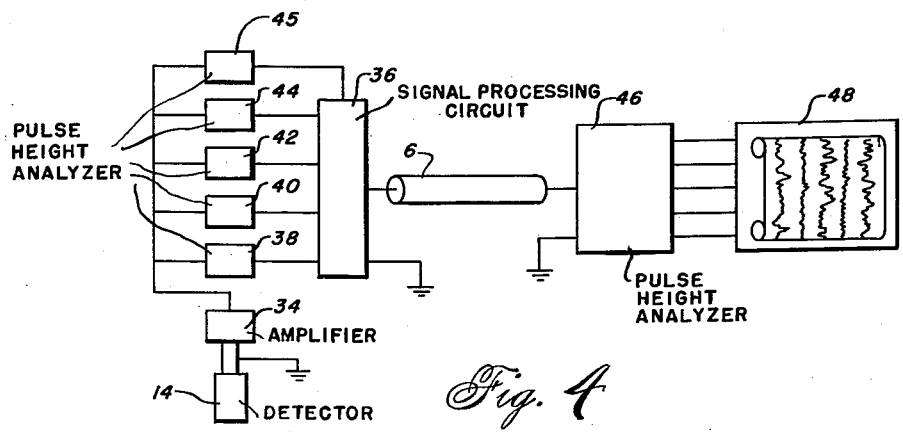
FIG. 4 is a diagrammatic representation of the electronic circuitry for the instrument of FIG. 1.

To make such a spectral analysis, the circuit of FIG. 4 may be employed. This circuit is similar to that of FIG. 1 except that a separate discriminator circuit is provided for each spectral band which is to be recorded. Thus, pulse height analyzer 38 passes only pulses corresponding to gamma rays having energies less than 100 kev. and more than 10 kev., a second pulse height analyzer 40 passes only pulses corresponding to gamma rays having energies less than 150 kev. and more than 100 kev., a third pulse height analyzer 42 passes pulses corresponding to gamma rays having energies above 100 kev. and less than 500 kev., while a fourth pulse height analyzer 44 passes pulses corresponding to gamma rays having energies greater than 500 kev. but less than 1 mev. and a fifth pulse height analyzer 45 passes pulses corresponding to gamma rays having energies in excess of 1 mev. Each of the pulse height analyzers 38, 40, 42, 44 and 45 passes a signal to the signal processing circuit 36 representing the gamma rays per unit time incident on detector 14 having energies within their respective portions of the gamma ray energy spectrums. The signal processing circuit 36 impresses these signals on the cable 6 for transmission to the surface of the earth. At the surface, the signals are removed from the cable 6 and are passed through a suitable signal separating circuit 46 which divides the signal transmitted by the signal processing circuit 36 into a plurality of separate signals corresponding to the signals of the various pulse height analyzer circuits 38, 40, 42, 44 and 45. These signals are then supplied to a multi-channel recorder which records each of the signals independently.

If desired, the pulse height analyzer circuits 38, 40, 42, 44 and 45 may be located at the surface. Moreover, if desired, additional pulse height analyzer circuits may be employed to provide additional channels of information. In addition, numerous variations and modifications may, obviously, be made without departing from the invention. Accordingly, it should be clearly understood that those forms of the invention described above and shown in the figures of the accompanying drawing are illustrative only and are not intended to limit the scope of the invention.

What I claim is:

1. Apparatus for radioactivity well logging comprising a subsurface instrument containing a gamma ray source composed of radioactive cobalt, a gamma ray detector of the type which emits electrical pulses systematically related to the energy of the respective gamma rays incident thereon, shielding substantially opaque to gamma rays having energies less than 500 kev., means urging said subsurface instrument against a wall of a well to be logged, a pair of spaced recesses formed in said shielding adjacent that portion of said instrument which is nearest the wall of the well, said detector being mounted in one of said recesses, said source being mounted in the other of said recesses, a plurality of independent electronic pulse height analyzer circuits each supplied with the output from said detector, one of said circuits emitting a signal corresponding to the number of gamma rays per unit time incident on said detector having energies less than 100 kev., a second of said circuits emitting a signal corresponding to the number of gamma rays per unit time incident on said detector having energies greater than 100 kev. and less than 150 kev., a third of said circuits emitting a signal corresponding to the number of gamma rays per unit time incident on said detector having energies greater than 100 kev. and less than 500 kev., a fourth of said circuits emitting a signal corresponding to the number of gamma rays per unit time incident on said detector having energies greater than 500 kev., and less than 1 mev., a fifth of said circuits emitting a signal corresponding to the number of gamma rays per unit time incident on said detector having energies greater than 1 mev., means for transmitting said signals to the surface of the earth, and means for independently recording each of said signals.

2. Apparatus for radioactivity well logging comprising a subsurface instrument containing a gamma ray source composed of radioactive cesium, a gamma ray detector of the type which emits electrical pulses systematically related to the energy of the respective gamma rays incident thereon, shielding substantially opaque to gamma rays having energies less than 500 kev., means urging said subsurface instrument against a wall of a well to be logged, a pair of spaced recesses formed in said shielding adjacent that portion of said instrument which is nearest the wall of said well, said detector being mounted in one of said recesses, said source being mounted in the other of said recesses, a plurality of independent electronic pulse height analyzer circuits each supplied with the output from said detector, one of said circuits emitting a signal corresponding to the number of gamma rays per unit time incident on said detector having energies less than 100 kev., a second of said circuits emitting a signal corresponding to the number of gamma rays per unit time incident on said detector having energies greater than 100 kev. and less than 150 kev., a third of said circuits emitting a signal corresponding to the number of gamma rays per unit time incident on said detector having energies greater than 100 kev. and less than 500 kev., a fourth of said circuits emitting a signal corresponding to the number of gamma rays per unit time incident on said detector having energies greater than 500 kev., and less than 1 mev., a fifth of said circuits emitting a signal corresponding to the number of gamma rays per unit time incident on said detector having energies greater than 1 mev., means for transmitting said signals to the surface of the earth, and means for independently recording each of said signals.

3. Apparatus for radioactivity well logging comprising a subsurface instrument containing a source of gamma rays generally of an energy less than the energy of natural gamma radiation, a gamma ray detector of the type which emits electrical pulses systematically related to the energy of the respective gamma rays incident thereon, shielding substantially opaque to gamma rays having energies less than 500 kev., means urging said subsurface instrument against a wall of a well to be logged, a pair of spaced recesses formed in said shielding adjacent that portion of said instrument which is nearest the wall of said well, said detector being mounted in one of said recesses, said source being mounted in the other of said recesses, a plurality of independent electronic pulse height analyzer circuits each supplied with the output from said detector, one of said circuits emitting a signal corresponding to the number of gamma rays per unit time incident on said detector having energies less than 100 kev., a second of said circuits emitting a signal corresponding to the number of gamma rays per unit time incident on said detector having energies greater than 100 kev. and less than 150 kev., a third of said circuits emitting a signal corresponding to the number of gamma rays per unit time incident on said detector having energies greater than 100 kev. and less than 500 kev., a fourth of said circuits emitting a signal corresponding to the number of gamma rays per unit time incident on said detector having energies greater than 100 kev. and less than said energy of the gamma rays emitted by said source, and a fifth of said circuits emitting a signal corresponding to the number of gamma rays per unit time incident on said detector having energies greater than said energy of the gamma rays emitted by said source.

References Cited in the file of this patent

UNITED STATES PATENTS

| | | |
|---|---|---|
| 2,469,460 | Fearon | May 10, 1949 |
| 2,469,461 | Russell | May 10, 1949 |
| 2,648,012 | Scherbatskoy | Aug. 4, 1953 |
| 2,692,949 | MacKnight | Oct. 26, 1954 |
| 2,710,925 | McKay | June 14, 1955 |
| 2,769,918 | Tittle | Nov. 6, 1956 |
| 2,888,568 | Jones et al. | May 26, 1959 |
| 2,934,652 | Caldwell et al. | Apr. 26, 1960 |

UNITED STATES PATENT OFFICE
CERTIFICATE OF CORRECTION

Patent No. 3,078,370            February 19, 1963

Ralph Monaghan

It is hereby certified that error appears in the above numbered patent requiring correction and that the said Letters Patent should read as corrected below.

Column 1, line 68, for "gamme" read -- gamma --; column 2, line 25, for "3 5/6" read -- 3 5/8 --.

Signed and sealed this 17th day of September 1963.

(SEAL)
Attest:

ERNEST W. SWIDER
Attesting Officer

DAVID L. LADD
Commissioner of Patents